US012511978B2

(12) United States Patent
Kline et al.

(10) Patent No.: US 12,511,978 B2
(45) Date of Patent: Dec. 30, 2025

(54) REAL-TIME IN-VENUE BETTING SYSTEM

(71) Applicant: FanThreeSixty, LLC, Leawood, KS (US)

(72) Inventors: Nic Kline, Leawood, KS (US); Bart Hampton, Leawood, KS (US); Jason Houseworth, Leawood, KS (US)

(73) Assignee: FanThreeSixty, LLC, Leawood, KS (US)

( * ) Notice: Subject to any disclaimer, the term of this patent is extended or adjusted under 35 U.S.C. 154(b) by 0 days.

(21) Appl. No.: 18/243,366

(22) Filed: Sep. 7, 2023

(65) Prior Publication Data

US 2023/0419788 A1 Dec. 28, 2023

Related U.S. Application Data

(63) Continuation of application No. 17/390,054, filed on Jul. 30, 2021, now Pat. No. 11,783,678, which is a continuation of application No. 16/410,687, filed on May 13, 2019, now Pat. No. 11,107,327.

(60) Provisional application No. 62/683,336, filed on Jun. 11, 2018, provisional application No. 62/675,864, filed on May 24, 2018.

(51) Int. Cl.
*G07F 17/32* (2006.01)

(52) U.S. Cl.
CPC ...... *G07F 17/3288* (2013.01); *G07F 17/3223* (2013.01)

(58) Field of Classification Search
None
See application file for complete search history.

(56) References Cited

U.S. PATENT DOCUMENTS

| | | | | |
|---|---|---|---|---|
| 9,767,645 | B1 * | 9/2017 | Cronin | G07F 17/3237 |
| 2012/0046096 | A1 * | 2/2012 | Morrison | G07F 17/3237 463/25 |
| 2015/0287278 | A1 * | 10/2015 | Shore | G07F 17/3248 463/29 |
| 2019/0244483 | A1 * | 8/2019 | Collins | A63F 13/352 |

* cited by examiner

*Primary Examiner* — Peter J Iannuzzi
(74) *Attorney, Agent, or Firm* — Erise IP, P.A.

(57) ABSTRACT

A system and method of placing a location-based bet is presented in embodiments herein. Bets, offers, and incentives, may be presented to a user via a mobile device based on a location of the mobile device relative to a geographic region. The geographic region may be associated with a sporting event or a sporting venue such as a sport arena. Different bets, offers, and incentives may be presented inside the geographic region than outside the geographic region based on the different experiences for the fans in each geographic region.

20 Claims, 4 Drawing Sheets

REAL-TIME IN-VENUE BETTING SYSTEM

RELATED APPLICATIONS

This patent application is a continuation application claiming priority benefit, with regard to all common subject matter, of U.S. patent application Ser. No. 17/390,054, filed Jul. 30, 2021, and entitled "REAL-TIME IN-VENUE BETTING SYSTEM" ("the '054 Application"). The '054 Application is a continuation application claiming priority benefit, with regard to all common subject matter, of U.S. patent application Ser. No. 16/410,687, filed May 13, 2019, now U.S. Pat. No. 11,107,327, issued Aug. 31, 2021, and entitled "REAL-TIME IN-VENUE BETTING SYSTEM" ("the '327 Patent"). The '327 Patent is a non-provisional patent application claiming priority benefit, with regard to all common subject matter, of earlier-filed U.S. Provisional Patent Application No. 62/675,864, filed May 24, 2018, and entitled "REAL-TIME IN-VENUE BETTING SYSTEM." The identified earlier-filed patent and patent applications are hereby incorporated by reference in their entirety into the present application.

The '327 Patent is a non-provisional patent application also claiming priority benefit, with regard to all common subject matter, of earlier-filed U.S. Provisional Patent Application No. 62/683,336, filed Jun. 11, 2018, and entitled "REAL-TIME IN-VENUE BETTING SYSTEM." This identified earlier-filed provisional patent application is hereby incorporated by reference in its entirety into the present application as well.

BACKGROUND

1 Field

Embodiments of the invention relate to presenting and receiving bets. More specifically, embodiments of the invention relate to presenting and receiving bets in a real-time location-based betting system.

2. Related Art

Typical application-based betting system provide a user with a purely digital experience. A user may access the application, make a bet, watch the outcome, collect winnings, and make another bet. Even where the system is based on real-time events, the bets offered are static and the user quickly becomes bored. The system does not provide a customized user betting experience based on the user location and real-time events. What is needed, is a system that customizes the experience to the user by providing real-time feedback, bets, offers, and incentives, based on the user's interaction with the application. Further, what is needed is an application that takes advantage of bets, offers, and incentives that may only be presented at a particular location such as, for example, at a sporting event, a restaurant, a tailgate party, or the like.

Combining sports betting with new technology allows new and exciting gambling possibilities to arise. For example, when viewing a live event via the Internet or a cable provider, there is typically at least a seven-second delay to allow time to edit and prevent airing any unwanted content. This delay creates a different viewing experience for the viewer at a live venue than for the person watching on a TV or computer. In particular, this delay has made gambling on short-duration events (such as individual plays) as they are occurring problematic. Because the outcome of the event may already be known to live viewers before the event begins for televised viewers, the bet may not be offered to all viewers as the outcome would be known to some. That is needed is a system that provides a different experience for fans based on location or viewing method. More specifically, what is needed is a system that provides for a different experience for in-venue fans as opposed to out-of-venue fans.

SUMMARY

Embodiments of the invention solve the above-described problems and provide a distinct advance in the art by providing a method and system for presenting betting options to fans at a sporting event in real-time. An application on a mobile device connects users with online betting features that enable the users to make pre-game and in-game bets. The users can access features of the application and make bets that are customized to their own preferences and may not be available to users that are not at the sporting event or otherwise within a specified geographic location. Geofencing and other geolocation technologies and relative location detection (as described below) can ensure that only viewers at specified locations can participate in prescribed bets.

A first embodiment is directed to one or more non-transitory computer-readable media storing computer executable instructions that, when executed by a processor, perform a method of placing a bet on a sporting event, the method comprising the steps of determining a location of a mobile device of a user relative to a geographic region, wherein the geographic region is associated with a sports venue, presenting, via the mobile device, one or more bets associated with the sporting event, receiving, from the user, a selection of a bet of the one or more bets, and determining a bet outcome of the bet based on a sports outcome in the sporting event.

A second embodiment is directed to a method of placing a bet on a sporting event, the method comprising the steps of determining a location of a mobile device of a user relative to a geographic region, presenting at least one bet via the mobile device to the user, selecting the bet from the at least one bet presented to the user, wherein the bet is associated with the location of the mobile device relative to the geographic region, determining a bet outcome of the bet based on a sports outcome in the sporting event, and presenting awards to the user.

A third embodiment is directed to a method of placing a bet on a sporting event, the method comprising the steps of verifying a location of a mobile device of a first user, generating a plurality of betting options, generating at least one offer associated with a bet of the plurality of betting options, receiving a selection of the bet from the plurality of betting options via the mobile device of the first user, receiving criteria for presenting the bet to a second user via the mobile device of the first user, and determining a bet outcome of the bet based on a sports outcome in the sporting event.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of this disclosure are described in detail below with reference to the attached drawing figures, wherein.

Figure 1:
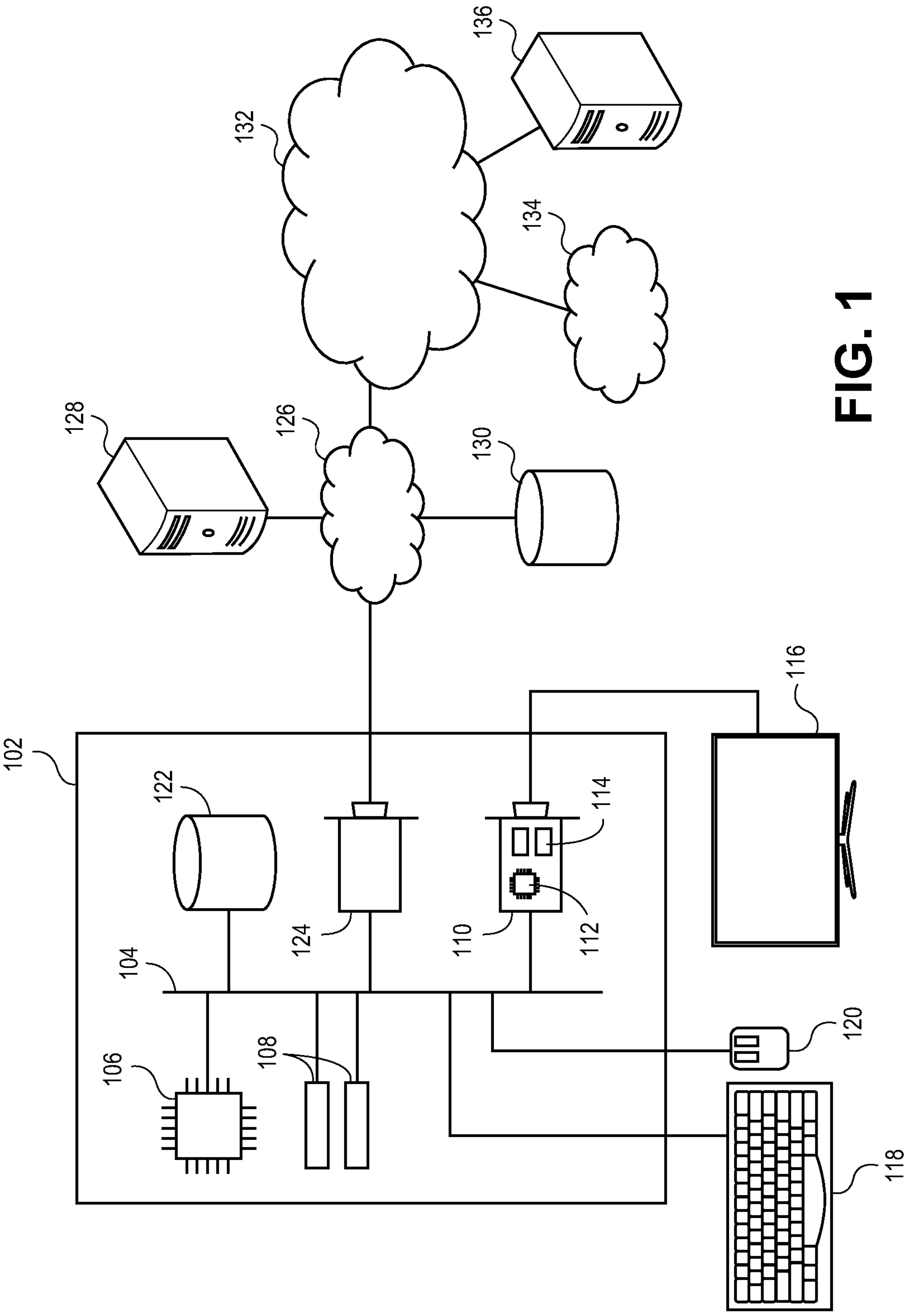
FIG. 1 depicts an embodiment of a hardware system for implementing embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Broadly speaking, embodiments of the invention provide for a user of an application to make customized bets and accept customized offers on a mobile device at a sporting event. For example, the user may be offered a bet based on the user's profile. The user's profile may store information related to user preferences such as, for example, a favorite player, and the offer may be based on the probability that the favorite player will, for example, score a soccer goal. The user may receive the bet based on the location of the user such as in the sporting event arena watching the game live. Fans outside the arena may not receive the same bet. The application may also create and offer bets based on a delay between the live event and the public broadcast of the event. For example, at the same soccer event, the user may bet on a corner kick that occurs within the delay time such that the results are known before a public broadcast. Since the results are known before the public broadcast the bet is not available to the fans viewing the game on the broadcast outside of the sporting event arena.

Turning first to FIG. 1, an exemplary hardware platform that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

In some embodiments, the application may run on a computer or mobile device or be accessed via the computer 102 which in some embodiments is a mobile device, and run in a web-based environment from the recipient's web browser. The web-based environment may store data such that it is not required for the mobile device or computer 102 to have downloaded and stored large amounts of data for the application. The application may access data such as object databases, user profiles, information related to other users, financial information, third party financial institutions, third party vendors, social media, or any other online service or website that is available over the Internet or otherwise in communication with the computer 102.

Broadly speaking, the invention allows for fans to place bets on real-time events based on the location and viewing of the sporting event for each individual fan. The bets may be based on game score, player performance, team performance or any other game play or characteristic for which money, items, or services may be gambled. In some embodiments, the bets may be proposition bets (also known as prop bets), novelty bets, side bets, or any other bet that may be conducted within a game. For example, a user may place a bet on the likelihood that a soccer player will score on a penalty kick. The bet may be placed before a game with a low likelihood such that the payout may be high or during the game when it is already decided that the player will take a penalty kick thus having increased probability and a lower payout. The bets may be placed in a peer-to-peer method such that a user may create customized bets with customized odds and bet against other fans viewing the event live in the arena, or at any location specified by the user or the application.

Broadly speaking, the invention contemplates restricting the offering and placement of bets based on a location of the user. For example, state or local regulations, or contractual restrictions may require that bets be placed only in the venue where the sporting event is taking place or otherwise presented by broadcast. Alternatively, bets may be required to be placed within a particular city, county, state, or other geographic region. In some embodiments, the user may request or otherwise register for bets while outside the region, but the bets are not actually placed until the user enters the region (as determined, for example, by the user's mobile device breaking a geofence within a specified timeframe).

In some embodiments, users may receive offers for incentives and bets. An offer may comprise incentives such as, for example, free food, beverages, seats at a sporting event, upgraded seats, increased loyalty status, or any other object, merchandise, or benefit that may be provided to the user at the sporting venue or any affiliated restaurant pub or any other location. In some embodiments an offer comprises bets such as, for example, early bets, location-based bets, and peer-to-peer bets. In some embodiments, different odds may be made to some users based on the profile of the user or the location of the user.

Figure 2:
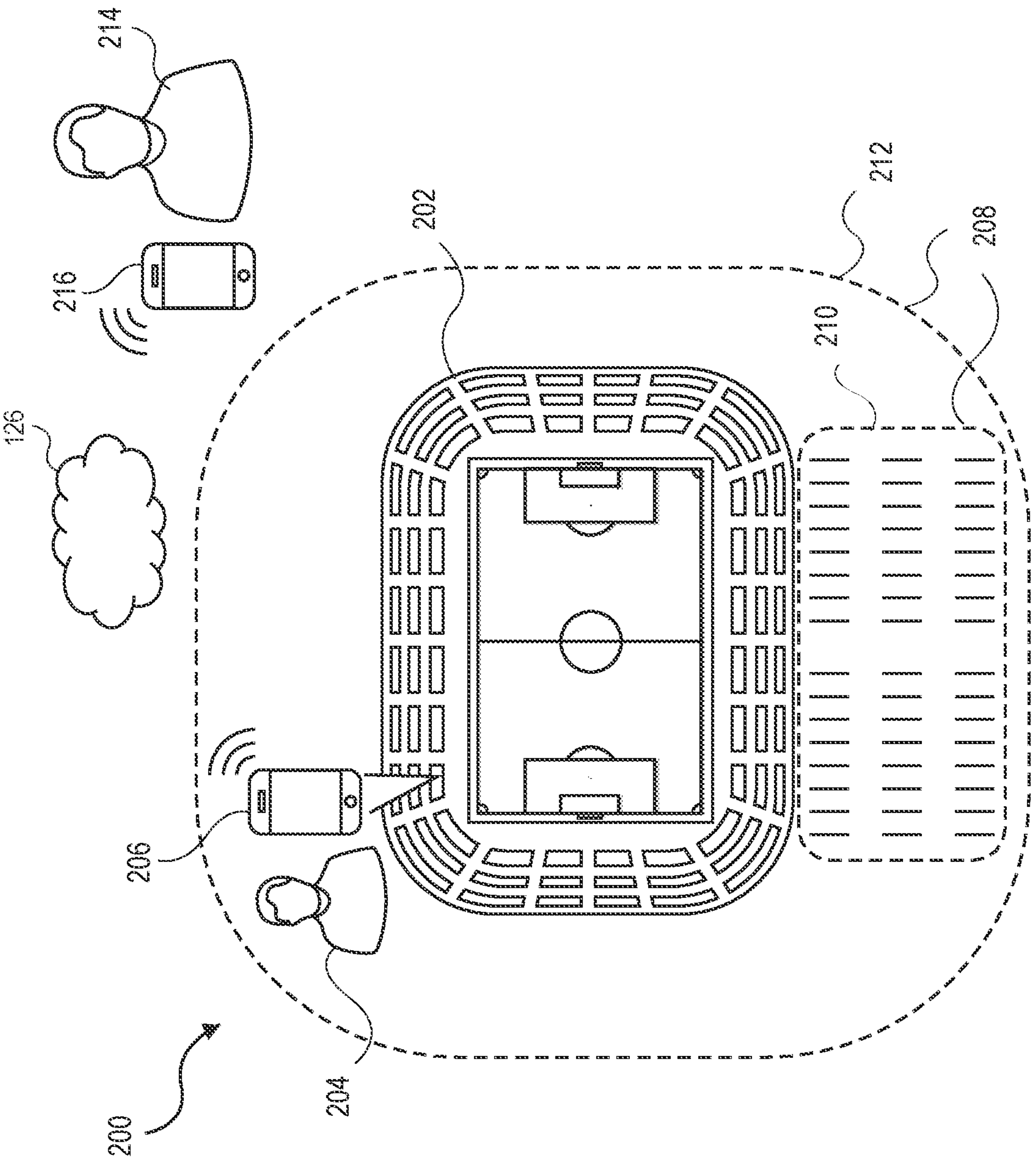
FIG. 2 depicts an exemplary scenario for implementing the invention.

FIG. 2 depicts an exemplary scenario 200 where the application may be utilized in which a sporting event may be held in an arena 202. A fan, or user 204, in the arena 202 may access the application via a mobile device 206. In some embodiments, the mobile device 206 may be connected to the network 126 in, or out of, the arena 202. In some embodiments, the network 126 provides the application from data store 130 as a cloud-based application. In some embodiments, the application is stored on the mobile device 206. In some embodiments, the mobile device 206 may be computer 126.

In some embodiments, geographic regions 208 may provide locations in which the application may be accessed via the mobile device 206. The geographic regions 208 may define boundaries and/or proximity in relation to a person, place, or thing such as, for example, the user 204, or the arena 202. The geographic regions 208 may be defined by geographic coordinates and/or proximity to a particular location or device. In some embodiments peripheral devices associated with the mobile device 206 may be accessed to determine the location of the mobile device 206 relative to the geographic regions 208 such as, for example, GPS, BLUETOOTH, Radio Frequency Identification (RFID) tags, or any other device that may be used to determine a location of the user 204 and/or the mobile device 206. In some embodiments, the location of the user may be determined based on the WiFi network (or associated ESSID) to which the user's mobile device is associated. In other embodiments the user's location may be determined based on a cell tower with which the user's mobile device is communicating.

In some embodiments, the geographic region 212 may surround the arena 202, thus all users within the geographic region 212 may be approved for accessing the application. In some embodiments, multiple geographic regions 208 may be present, thus providing different rules, offer, bets, and incentives based on the different regions 208. For example, the user 204 accessing the mobile device 206 within the geographic region 212 may receive an offer to upgrade seats based on a bet. Similarly, an outside user 214 may access the outside mobile device 216 that is located outside the geographic region 212. Because the outside user 214 is not located inside the arena 202, the outside user 214 may receive free tickets to attend the sporting event held inside the arena 202 based on a similar bet. Further, the user 204 may be located within the parking region 210. As another example, the user 204 within parking region 210 may be tailgating and may receive a betting offer that includes a voucher to an associated vendor within the arena 202 to entice the user 204 to enter the arena 204 or the voucher may be for a vendor outside the arena 202 such that the user 204 may receive a discount on tailgating supplies at the next event. The exemplary scenarios provided above present different bets, offers, and incentives relative to the geographic regions 208 and relative to the arena 202. In some embodiments, the arena 202 may be a restaurant, pub, bar, or any other location. In some embodiments, venue and the arena 202 may be interchangeable such that the arena may represent any of a restaurant, a pub, a bar, or any other location.

In some embodiments, the user 204 may be outside user 214 and the mobile device 206 may be outside mobile device 216, and in some embodiments the user 204 is discussed in different locations relative to the different geographic regions 208 and the arena 202. It should be noted that in embodiments described herein, locations such as the arena 202 and the geographic regions 208 may be used interchangeably such that, in examples, a bet offered or placed in the arena 202 may be exemplary and any region of the geographic regions 208 may also be used in place of the arena 202 as a location for offering, receiving, and placing bets.

Figure 3:
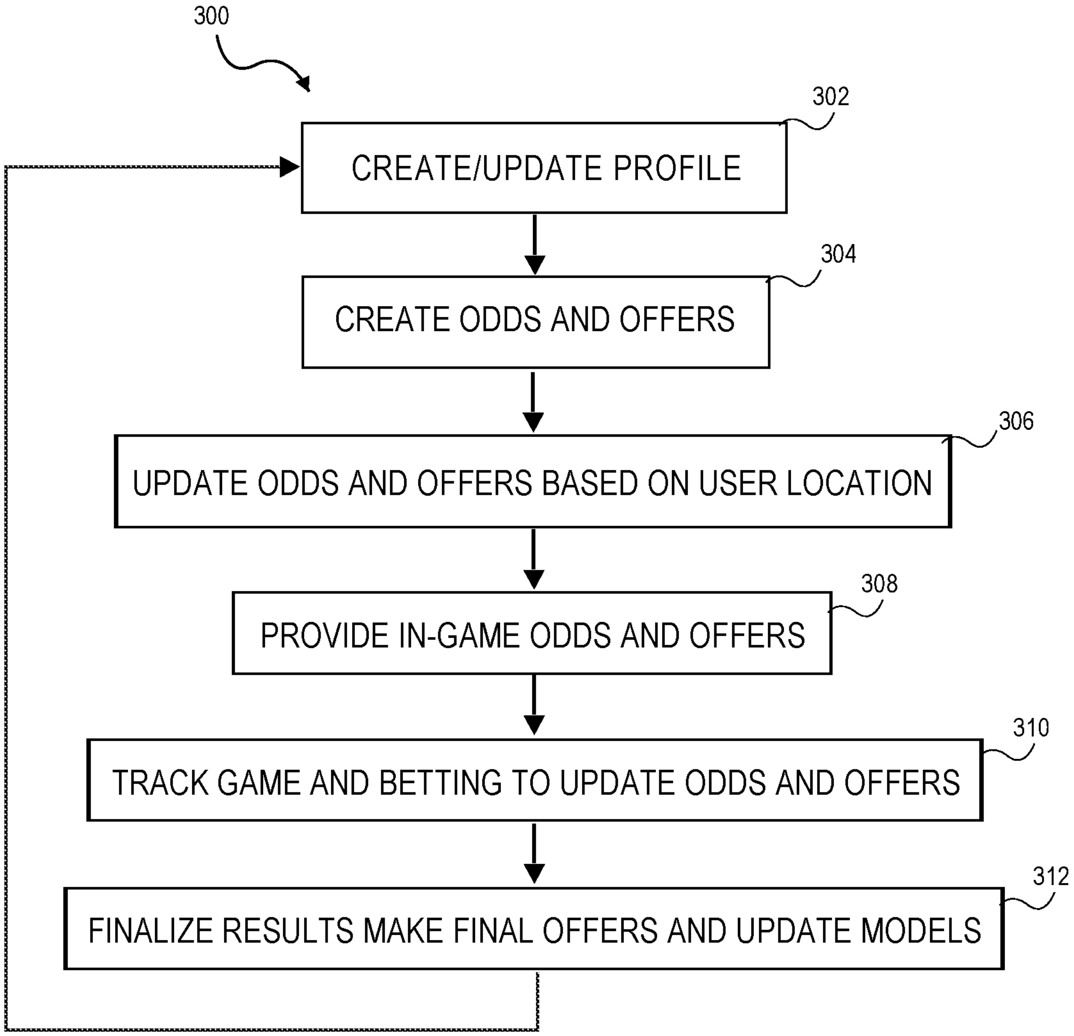
FIG. 3 depicts an exemplary flow diagram for methods of the invention.

Some embodiments of the invention may be represented by an exemplary method 300 depicted in FIG. 3. Initially at step 302, the application may be downloaded on the mobile device 206 or computer 102 or accessed via the Internet as in a cloud-based application. The user 204, in the case of a new user, is prompted to set up a profile for use with the application. The user 204 may input such exemplary items as age, race, nationality, favorite teams, favorites players, favorite arenas, favorite venue to watch games outside of the arena, favorite seats or locations within the arena, smoker or nonsmoker, or any other information that may be used to create customized offers and a unique experience for the user 204. For example, if a favorite player of the user 204 is involved in a play (such as, for example, a penalty kick), an offer of a proposition bet may be pushed to the user 204 while the play is in progress or just prior to start of the play. A different user with a different favorite player may not be offered this bet or may be offered the bet at different odds. The profile of the user 204 may be stored such that the user 204 may access the profile at any time and update the profile with any new information via any Internet-accessible device. The profile of the user 204 may be used to offer user-specific incentives, odds, bets, or any other items that may be customized for the user 204.

The profile of the user 204 may be associated with an account for direct financial transactions such as a savings, checking, or a credit card account or any indirect financial transactions through an intermediate third-party financial transaction institution may be conducted. In some embodiments, the profile of the user 204 may store biometric data for the user 204. This can be used, for example, to confirm that the user 204 is the person placing a bet by requiring (for example) that the user 204 provide a fingerprint when a bet is placed. Alternatively, facial recognition, voice recognition, a retinal scan, or any other biometrics may be employed. This may provide a high level of security to the financial transactions conducted by the user 204.

The profile of the user 204 may also store historical information based on the actions or interactions with the application by the user 204. Financial transactions, placed bets, online searches, or any information gathered from any of the online databases mentioned above may be used to assist in creating a unique experience for the user 204. The profile and account may be updated continuously such that the offers are based on the newest information from the user 204 and associated context received from the mobile device 206 such as GPS location or information from cameras, biometric sensors, accelerometers, gyroscopes, retinal scanners, or the like. For example, if the accelerometer in the mobile device 206 indicates that user 204 has thrown their hands in the air, this may indicate a high level of excitement and cause a new bet to be offered to the user 204. The accounts may be updated continuously to track spending, betting, or any other interaction by the user 204 with the mobile device 206 and the application.

At step 304, the application may make offers based on the profile of the user 204. The user 204 may be offered different levels of activity and interaction. For example, the user 204 may sign up for a loyalty program that offers different levels and higher incentives or betting odds based on the level of the loyalty program. For example, the user 204 may initially sign up for a low-level loyalty program representative of the user 204 attending one event per year at the arena 202. The user 204 may also indicate that they wish to bet for entertainment at low levels such as $1-5 dollars at a time and no more than five bets per game. This allows the user 204 to set a limit on the money they spend and allows the application to automatically customize the odds, the bets, and the timing of the bets to provide the user 204 with an experience tailored to their preferences.

In some embodiments, the bets are offered to all users. Some bets may be tailored to the specific user 204 based on the betting history and the profile of the user 204. Profiles of other users may be analyzed for similarities such as betting trends associated with, for example, teams, players, amounts, or any other betting trends that may be tracked. When similar trends are found the bets offered to the user 204 may also be offered to the users with similar histories stored on the profiles.

Further, in some embodiments, new users may receive offers and bets based on similarities in user profiles. When the user 204 is a new user, the profile of the user 204 may be compared to profiles of established users to determine offers and bets that are likely appealing to the user 204. When the user 204 starts a new profile the user 204 may prompted to fill out a questionnaire. The user 204 may be presented with questions for establishing a category in which the user 204 may be placed. For example, the user 204 may be asked what their favorite sport is. Upon entering soccer, the user 204 is placed in a group with other users that indicated that soccer is their favorite sport. Over time, the application may track bets and offers as well as activity by the user 204 to determine the most valuable questions, or the questions that provide the best insight into how the user 204 will interact with the application. This may provide an optimal starting point for the user 204 and the application administrators.

In an alternative example for step 304, the user 204 may be a long-time loyalty program member and have season tickets. In this case, when the user 204 indicates electronically, such as via social media, that they are attending a game, bets may be offered to the user 204 even before the day of the game. Further, the bets may be offered in a package with associated incentives. For example, the application may offer free seat upgrades or price reductions on concessions and merchandise to frequent users or high-dollar bettors. The user 204 may also be offered betting options to lock in bets at fixed odds prior to entering the arena 202. For example, the user 204 may bet on the home team to win outright at 3:1 odds one day prior to the game. If, in such an embodiment, the opposing team announces that a star player will not play, the odds-on offer may change to 2:1 thus paying out less. However, the user 204, who locked in their bet at 3:1 odds, will maintain those odds even though the bet is not live (i.e., is not officially placed for regulatory purposes) until the user 204 enters the arena 202 or geographic region 212.

Bets, offers, and incentives may also be made based on profile information, social media posts, or any other information that may be attained through interaction with the user via any applications or profiles accessible on the mobile device 206. For example, if advanced ticket sales suggest that a particular game will be poorly attended and the user 204 has a history of placing bets, the user 204 may be offered favorable odds on that game to encourage the user 204 to attend. Alternatively or in addition, the application may notify the user 204 of the promotions that are being held at the arena 202 for the next game. The user 204 may also be given free seat upgrades for games that may not be well attended or the user 204 may be presented with concessions to encourage them to place additional bets. Thus, attendance at a sporting event can be used to encourage betting and betting can be used to encourage attendance. Any information associated with the user 204 or the history and profile of the user 204 may be used to provide offers to the user 204 prior to entering the sporting arena 202 or prior to, during, or post game at any locations relative to the geographic regions 208 and the arena 202.

At step 306, the application is updated based on a mobile device 206 associated with the user 204 detecting the location of the user 204 such as when the user 204 crosses into a predetermined zone such as the geographic region 212. The geographic region 212 may be the exterior or interior of the arena 202 or may be a set distance from the arena 202 or a geofenced area defining the particular coordinates or the parking lot or property of the arena 202. The geographic region 212 may also be associated with another location such as a casino or restaurant that is associated with the sporting event that may be occurring in the arena 202. For example, if the user 204 placed bets prior to attending a game, the time may be stored and then, upon entrance into the gates of the arena 202, the bet goes live and the bet of the user 204 is placed at the odds from the time the user 204 placed the bet. Similarly, the user 204 may enter a restaurant granted a promotion by the sporting event organizers and the user 204 may gain all or some of the promotional and betting advantages at the restaurant.

Incentives and betting offers may also be presented based on when the user 204 enters the arena 202. For example, the user 204 may get better odds on bets the earlier the user 204 enters the arena 202. Certain bets and offers may only be provided inside the arena 202 and at particular times. For example, better odds may be provided thirty minutes before the start of a sporting contest. This may bring users into the stadium early. Special offers may also be provided along with the odds. For example, a special price for beverages may be provided for any user that places a bet thirty minutes before the start of the contest. This may entice the user 204 to arrive to the arena 204 early.

Alternatively, special offers may be provided to users outside the arena 202 but within a particular geographical area 212 as defined by, for example, a geofence and referenced by the mobile device 206 or otherwise any device the user 204 is utilizing to access the application. For example, special offers affiliated with local grocery stores may be offered to the user 204 tailgating. When the user 204 places a particular bet they may get a voucher for half price ribs at the nearby affiliated grocery store. These deals may also be offered to the user 204 that has tickets prior to entering the geofence or the arena 202 such that the user 204 may get a voucher to get a reduced price the next time the user 204 visits the grocery store. Similarly, the user may receive a credit added to the profile of the user 204 for a free or reduced-price bet when the user 204 enters the geofenced area, geographic region 212, or the associated arena 202.

In some embodiments, the geographic regions 208 may be located within the 202 arena and associated with seat locations or relative concessions locations or may be based on a Bluetooth™ beacon, radio frequency identification (RFID) beacon, or any other locally transmitting device may be used to locate the mobile device 206 of the user 204 and initiate notifications. Similarly, the geographic regions 208 may define sections of a restaurant, bar, or outdoor viewing area. In some embodiments, the user 204 may receive bets and odds based on the profile of the user 204 and the location of the user 204 inside the arena 202. For example, if the user 202 is detected as being in the beer tent, this information may be used to offer the user 204 additional bets or offers such as free drinks for placing particular bets. Similarly, the profile of the user 204 may indicate that the user 204 is sitting in the highest priced seats in the arena 202 and/or historically places high-dollar bets throughout the course of the game. As a result, the user 204 may be offered selective bets that are only offered to high rollers. The high-roller bets may not be offered to other users and may only be offered to users of certain levels of the loyalty program. Furthermore, when a bet is offered at given odds, one or more pre-determined bet amounts may be presented to the user 204 based on their location or seats. For example, the same bet may be offered to users in general admission seats at $1, $5, or $10 amounts, to users in box seats at $10, $50, and $100 amounts, and to users in suites at $100, $500, and $1,000 amounts.

Moving now to step 308, the application may present in-play, or in-game, betting to the user 204 based on the location of the user 204. The user 204 may be provided proposition, prop, novelty, or side, bets at the arena 202 or at a local establishment as described in embodiments above. In some embodiments, the user 202 may have certain advantages betting within the arena 202 or geographic regions 208. The user 204 may be given better odds or more betting options based on the user 204 watching the game live at the arena 202. For example, there may be a delay between the live action of a sporting event and the action that a fan views provided by a broadcaster such as a cable provider or over the Internet. The user 204 at the sporting event watching live does not experience this delay, creating, typically, a seven-second window between the experience of the user 204 at the arena 202 and the fan's experience watching on a TV or computer. This delay may be used as an advantage for the user 204 at the arena 202 to make bets before the broadcast or bets that are not possible for the fan viewing the broadcast.

Similarly, the odds and bets offered to the user 204 may be changed based on the progress of the sporting event to further take advantage of the time delay for the broadcast discussed above. In an exemplary soccer scenario, a soccer ball goes out of bounds on the goal side of a visiting team off of a visiting-team player. This creates a corner-kick scenario where a home-team player sets the ball in the corner of the field adjacent the visitor goal and kicks the ball into play. This is an exciting play in a soccer game and is a play that has a relatively high chance of scoring as compared to regular play. However, this play may take only a few seconds from the time the ball goes out of bounds until the home player kicks the ball back into play. As such, by the time the bet can be offered to broadcast viewers, the play may have already occurred and the results would be known. As such, a prop bet, as discussed above, based on the outcome of this play (for example, a bet regarding whether the kick results in a goal being scored) may be offered only to users attending the game at the venue in which the sporting event is taking place such as, for example, the arena 202. This type of play and betting option may be generalized to other sports, for example, each at-bat in baseball, each play or drive in football, each round in boxing or mixed martial arts, instant replay, or any other quick-play event that may create a time constraint on betting. In this way, embodiments of the invention solve the technical problem of betting on unpredictable, short-duration events in the presence of a tape delay by using geofencing to limit what bets are offered to users based on their location and proximity to the event.

In some embodiments, the prop bet can be provided by an automatic system tracking the on-field play such as tracking the ball and the players indicating that a corner kick is imminent and automatically providing a bet which may be customized to the user 204 based on the profile of the user 204 and the location of the user 204. Alternatively or in addition, an oddsmaker may also create betting offers and push them to user 204 viewing the game based on events occurring in the game as they occur in real time.

In some embodiments, pre-created bets can be pre-cached on the mobile device 206 of the user 204 and made active when a triggering event occurs. For example, a corner kick betting option may be determined based on the profile of the user 204 and created and stored in the mobile device 206 cache. In some embodiments, the graphics, animations, and other elements of the bet prompt may be pre-cached on the mobile device 206 so that only a minimal amount of information need be transmitted to initiate the bet offer. The bet offer may include odds, a bet, and incentives to place the bet such as, for example, sporting event tickets, seat upgrades, concessions, loyalty points, loyalty status upgrade, vendor vouchers, and any other benefit to the user 204.

In some such embodiments, the bet offer may be pushed to the mobile device 206 of the user 204. For example, when a corner kick scenario occurs as described above, a designated application administrator enters a number of the player performing the kick into the application (e.g. number 8) and the bet is updated and goes live. For example, the user 204 may receive a pop-up notification asking "Will Zusi score on his penalty kick? Bet now!" with options for a $1 bet at 1:2 odds, a $5 bet at 1:1.75 odds, and a $10 bet at 1:1.5 odds. To increase urgency, a stopwatch or other countdown may also be displayed informing the user 204 how long they have to place the bet. The timer may allow the user 30 seconds, 20 seconds, 15 seconds, 10 seconds, 5 seconds, or any other amount of time to place the bet. The user 204 may receive such notifications based on their fan affiliation, or be offered different odds or bet amounts than other fans because the user 204 has designated Zusi as their favorite player.

To ensure that the user 204 has time to make the bet, the bets may be offered in a one-click betting feature. The application may use the profile of the user 204 to determine and present bets that the user frequently makes or is likely to place and present the bets in a quick one-click method along with the timer creating urgency in placing the bet. The betting offers may update along with a tracked history of the user 204 interactions with the application such that the bets may increase or decrease based on the betting history or the wins and loses of the user 204.

Similarly, in some embodiments, bets may be made inside the arena 202 and locked so that bets can be made outside the arena 202 in a specified time period. The fan experience of the sporting event may be different inside the arena 202 and outside the arena 202. In general, fans may be influenced by the announcers providing information at the arena 202 as opposed to the announcers providing commentary over a television or radio broadcast. Further, fans viewing a television broadcast may be provided different views and angles of particular plays as well as insight during instant review of plays. Further still, fans within the arena 202 watching the sporting event live may see players outside the view of the cameras televising the event. For example, the user 204 at the arena 202 may notice that a particular defender is slouching and appears to be tired. The outside user 214 watching a live broadcast outside of the sporting event may not have this information. As such, it may be more likely that the user 204 in the arena 202 will bet that the opposing team will score in the next possession. Therefore, the application may provide different odds and different bets and offers based on the likelihood for users to bet a particular way inside the arena 202 as opposed to outside of the arena 202.

In some embodiments, betting offers are changed based on a determined excitement level and based on in-game activities. For example, different bets may be offered at exciting moments such as when a goal is scored or when the home team steals the ball from the visiting team and bets may be offered more frequently when the game is close or at critical moments. For example, the opposing team scores with five minutes left to tie the game, based on the expected excitement level of the fans, a bet that the home team scores in the next five minutes may be offered. As such, the betting features may take advantage of the exciting moments in the sporting event.

The measured excitement level described above may also be affected by physiological data such as a heart rate of the user 204 as determined by a biometric sensor or a sound level in the arena 202 as measured by sensors in the arena 202 or on the mobile device 206 of the user 204. The application may also access features of the mobile device 206 such as the accelerometer. When the accelerometer indicates that the user 204 has raised their hands in a celebratory motion, additional or different betting offers may be presented to the user 204. For example, the home team scores and the user 204 raises their hands as determined by the accelerometer on the mobile device 206. Simultaneously, the microphone on the mobile device 206 detects loud cheers that may be compared to stored data to determine if the cheers are for a relatively good experience or bad experience. The application may determine that the cheers are for a good experience and also determine that this set of events relates to high betting conditions and high concession sales. A bet is then offered to the user 204 along with a coupon for a free beverage if the user 204 accepts the bet.

At step 310 the application may track in-game changes and update information associated with bets and offers. As the game carries on, the bets may be tracked and adapted to the in-game play, betting trends, or any other trends such as concession and merchandise sales. For example, if the user 204 wins $100 on an in-game prop bet, then the user 204 may receive an offer for a 10% discount on merchandise, concessions and/or future tickets to encourage them to spend their winnings at the arena 202. This offer may be made concurrently with the win of the user 204, or afterwards based on the location and profile of the user 204. For example, the application may track spending of the user 204 and determine that the user 204 only spends $50 on bets at each sporting event. When the user 204 has spent $50, the application transitions from offering bets to offering concessions or bets for the next sporting event.

In some embodiments, the offers and bets are based on the in-game play of the sporting event. For example, the visiting team may jump out to an early lead creating a high probability of a blowout. This typically leads to fans spending less money and leaving early. The application may provide incentives for the application users to stay and keep playing. For example, the offers for concession items and prices may be reduced for high rollers or for users who place a certain total dollar value of number of bets. Additionally, betting odds may be adjusted favorably for the users to keep them interested and provide statistically better odds or higher payouts in the event of a win. This may also be an incentive for fans to become users by downloading the application during a game when the fans see the user 204 excitement while interacting with the application.

In some embodiments, the application may update and make predictions based on large-scale trends in betting as a predictor of future outcomes. This may be used to update the mathematical models used to create and update betting odds. The in-game features may also be used to select concession and merchandise prices. Returning to the exemplary embodiment described above where a particular player assists a corner kick, if, for example, seventy percent of people bet on that player to get an assist, this may be an indication that that player is a fan favorite, and a notification may be sent to the users that won that bet announcing a 20% discount for that player's jersey for the remainder of the game.

The application may also use betting trends to predict sales. For example, the home team is winning and betting is high. This typically leads to more beer sales in the second half. In such a scenario, beer prices may be adjusted accordingly, or additional beer vendors may be dispatched to the concessions area or particular areas of the arena 202 where beer sales are high. In some embodiments, the user 204 is a high-level loyalty user and may be offered a discount on beer based on this prediction. Additionally, tickets to other sporting events, hotels, or any other promotion may be offered based on the profile of the user 204 and loyalty program membership.

At step 312, post-game offers may be made to the user 204 based on the events before and during the sporting event. For example, users who won money over the course of the sporting event may be offered upgraded seats at the next game and users who lost may be offered free or discounted tickets to a future game. The user profiles and algorithms used in determining odds, bets, and incentives may be updated with the results of the bets and the placed bets to provide incentives and future betting options that may be desirable to each user. For example, the user 204 may be offered free concessions, seat upgrades, or a voucher to a local grocery store for tailgating supplies. The user 204 may select and use the voucher. Future offers may be centered around this selection, thus providing the user 204 more offers that are customized to the user 204 preferences.

Similarly, the application may learn and store the preferences of the user 204 such that the offers are adapted to the style of betting and preferred bets of the user 204. For example, if the user 204 accepts a large fraction of corner-kick bets, then the user 204 may be offered more corner-kick bets in the future. Similarly, if the user 204 places a large number of bets on plays involving a particular player, then more bets for that player may be offered during future games. This may occur in real time during the course of the game and the profile of the user 204 may be updated during or after the game to enhance the experience for the user 204 for the next game. Similarly, bets offered to the user 204 that the user 204 does not accept may not be offered in the future. This decreases the amount of undesired bets that the user 204 receives, thus providing higher satisfaction to the user 204.

The user 204 may be sent questionnaires to assist in customizing the experience to the preferences of the user. Some embodiments of the invention utilize machine learning, neural networks, fuzzy logic, or any other statistical, or general mathematical algorithm or artificial intelligence to increase the efficiency of the application and create a more user-friendly experience. The mathematical algorithms may be used for offering incentives and bets based on online databases such as social media or user location, user demographics, or the profile of the user 204 updated in real time. The mathematical algorithms may be used along with user feedback to increase customer satisfaction. Positive feedback may be used to strengthen the positive experiences offering more options from the positive results thus increasing the likelihood of positive experiences and decreasing the likelihood of negative experiences.

Figure 4:
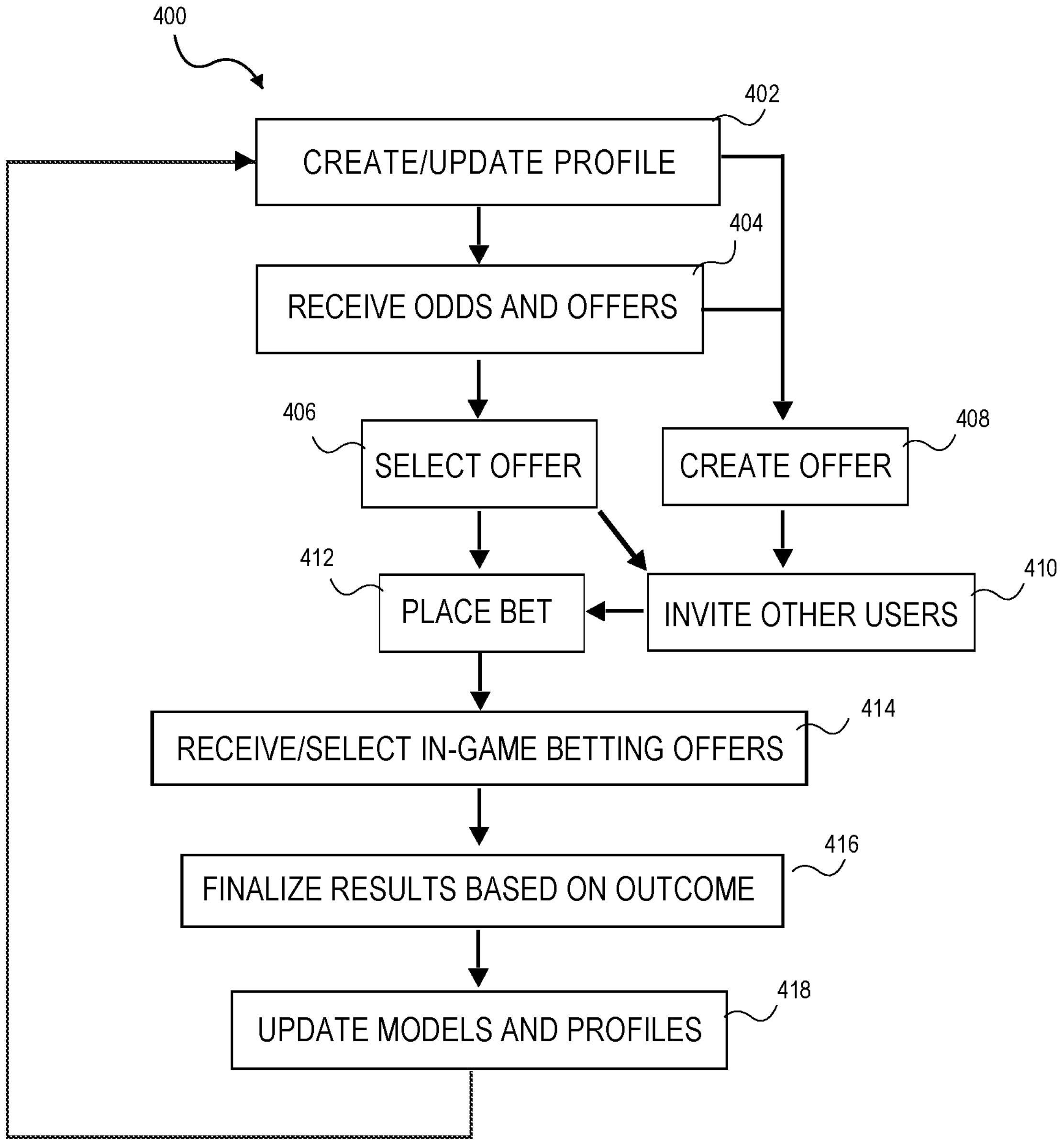
FIG. 4 depicts an exemplary flow diagram for methods of the invention.

Turning now to FIG. 4 depicting an exemplary flow diagram 400 presenting an exemplary method of the user 204 placing a bet using the application. At step 402, the user 204 may be offered bets, incentives, or awards based on the profile of the user 204 and betting history. The user 204 may receive the offers via the application accessible via the mobile device 206. The offers and/or access to the application and the offers may be location based such that the user 204 may receive particular offers inside or outside of the arena 202 and the geographic regions 208 as described in embodiments above.

At step 404, the user 204 may receive offers via the application on the mobile device 206 as described in embodiments above. In some embodiments, the user 204 may be allowed to accept bets only in restricted areas. For example, a bet may only be made in the arena 204 or, in some embodiments, the bet may only go live when the user 204 enters a boundary defining the betting area as described in embodiments above. In some embodiments, the user 204 may only make bets outside of a designated area such as the arena 204 and geographic regions 208 as describe above. The user 204 may make bets in any combination of locations as described in embodiments presented above.

At step 406, the user 204 may select bets and offers via the mobile device 206 when in a specified designated geographic region 208 as described in embodiments above. The bet may be offered via the application from the administrators or may be offered through a third-party betting site. In some embodiments, quick-bets or time limited bets may be offered in house as the odds and bets may be limited to seconds for the bets as described in embodiments above.

At step 408, the user 204 may create offers and bets. The offers and the bets may be used by the user 204 to create bets with other users of the application or the user 204 may create original bets with original odds. The user 204 may create competition or peer-to-peer bets that may be placed with location restrictions as described in embodiments herein.

In some embodiments, the bets may be made and customized by the user 204 and only conducted with friends or peers in the arena 202. Rather than betting against house odds the user 204 may customize the bets with a restricted access feature in the application that instantly connects other users in the arena 202 or geographic regions 208 for head-to-head or team competition. For example, a notification may be sent to the user 204 that the corner kick, as described above, is occurring and the user 204 may select a betting option in the restricted access peer-to-peer betting feature such that the user selects a $5 bet that a particular player will make or assist a goal. Another user, for example sportingfan01 (who may be a friend of the user 204, a fan of the opposing team, or any other person eligible to place bets on the game), with access to the same feature and in the arena 202, makes a bet that that player will not make or assist a goal. Another player kicks the ball in, giving the player on whom the bet is made an assist and winning the bet for the user 204. The user 204 gets the $5 bet back and part (or all) of sportingfan01's bet as determined by house rules. Any amount may be taken from the bet as the house cut based on the total bet, individual bet, or winnings and the amount taken may be a fraction of the bet or a predetermined amount.

In some embodiments, features such as the in-game peer-to-peer betting may only be available to high-rollers or users of a certain level loyalty program. This may provide incentive to users to increase their loyalty program level to access better games, better odds, and more offers. User categorization may also allow users of a certain groups to create their own bets and create their own betting lines within the peer-to-peer betting feature.

In some embodiments, the bets are protected by employing user identification methods. The user 204 may place any of the bets described above accessing the application and selecting or creating bets. The user 204 may be required to enter a password or a PIN to make or create bets. The application may access a database of stored information related to the user 204 such as personal identification numbers, passwords, and images such as retinal, facial, thumb, and fingerprint scans. The application may also access features of the betting device for user identification. For example, the user 204 may provide a fingerprint or thumbprint verification before, during, or after the bet is placed. The application may also take a picture and compare with facial images for facial recognition. This image may be stored or uploaded to a central server in case of a user who disputes that a bet was placed. This may protect the user 204, the bet, and the house from fraudulent activities.

At step 410, the user 204 may access the application via the mobile device 206 and invite other application users to join the bet that the user 204 created. In some embodiments, the user 204 may invite other users within the same arena 202 or geographic region 208 as the user 204. For example, the user 204 may offer a bet to fans of the opposing team within the arena 202. In some embodiments, the user 204 may invite any other users in any relative location to the arena 202, geographic region 212, parking region 210, or any other location that may be defined by geographic coordinates or relative location. In some embodiments, the user 204 may invite other users based on criteria such as friends of the user 204 or users with similar favorite teams, favorite players, in the same or different locations or geographic regions 208, and venues.

In an exemplary embodiment utilizing the peer-to-peer betting feature, the user 204 may receive a notification indicating that sportingfan01 won their last peer-to-peer bet. The user 204 creates a bet and challenges sportingfan01 with a $50 bet on who will win the game at 2-to-1 odds provided by third-party statistics. The third-party statistics may be provided by a casino or verified online gambling site. Alternatively, the user 204 may propose their own odds, which may be accepted or counter-offered by other users. Upon receiving a notification that sportingfan01 has accepted the bet, a second notification asking the user 204 if they would like the bet to be open to other fans is received. The user 204 accepts the terms and the bet is open to other fans in the arena 202. Other fans in the arena 202 that wager similar bets, as determined by user betting history, are notified and allowed to accept or reject the bet. In certain embodiments, the users in the arena 202 may be filtered by team affiliation, loyalty level, seat location, dollar amount of bets, number of bets per game, or any other method of categorization. The users may be filtered by the user 204 or automatically by the application accessing user preferences for any bet created by the user 204 or generated by the application.

In another exemplary embodiment of the peer-to-peer betting feature, the user 204 may place a bet using betting lines provided by a verified third party such as a casino or an online betting site and the bet may be automatically matched to other users in the arena 202 or geographic regions 208. The application may match the bet of the user 204 with a bet of a second user betting the opposite way therefore putting the users head-to-head instead of placing the bet through the third party. For example, the user 204 bets on verified betting lines provided by the third party that the home team will win 2-1. Sportingfan01 bets that the visiting team will win 2-1. Based on the verified odds, for example, the game is a toss-up, as such the bets are equivalent with equivalent payouts. The application places these bets user versus user in the peer-to-peer betting feature such that a third-party site is not involved.

In some embodiments, the application accesses user information from, for example, the profile of the user 204, social media, and location of the user 204 to categorize users and provide betting options as described in embodiments above. The application may also use the information gained from the users to predict betting trends and set betting lines based on these predictions. For example, the user 204 may have a history of making prop bets on the number of red cards that will occur in a game. The Sportingfan01 indicates that their favorite player has the most red cards in the league. The user 204 may create a bet related to red cards. The application may find other users such as Sportingfan01 that have similar skills, likes, dislikes, and/or interests and create a list of a plurality of users to recommend to the user 204. The user 204 may select users from the plurality of users provided on the list. In some embodiments, the application may automatically proposition Sportingfan01 to bet on a bet created by the user 204. The options for automatically offering the bet to the other users and presenting a list for selection to the user 204 may be a customizable feature that the user 204 may decide and select as a setting in the application.

In some embodiments, the user 204 may create a bet by providing their own odds and filtering the users in the arena 202 that receive notification of the bet. The user 204 may supply information such as favorite player or team affiliation and place bets based on these user characteristics stored in the profile of the user 204. The application may filter the users based on these user characteristics and find like-minded users to bet with the user 204. The application may also find users with opposing views to bet against the user. The user 204 may select the other users that are allowed to bet. For example, the user 204 may want only users of the visiting team to receive the bet. In this way, personal bias may be predictable and the betting odds may be swayed in favor of the user 204 creating the bet. The users in the arena 202 may be filtered by the user 204 in any of the methods described above.

At step 412, the user 204 and any other users may place bets. The bets placed may be placed before the start of the sporting event or during the sporting event and may be based on an outcome of the sporting event or any actions during the sporting event. The bets may be placed at any of the defined geographic regions 208, within or outside the arena 202, and at any relative location to the arena 202 and the geographic regions 208. In some embodiments, the bets may be placed prior to entering a location such as the geographic region 212 where the bet is enabled. The bet may go live and be placed automatically when the user 204 crosses into the geographic region 212 as described in embodiments above.

At step 414, the user may accept awards, offers, and/or bets based on user interactions with the application during or before the sporting event. In some embodiments, the user 204 may receive rewards, vouchers, bets or any other benefit based on placing bets. For example, the user 204 may place bets prior to the sporting event and receive a discount on food for tailgating before the game or receive a voucher to purchase discounted tickets. In some embodiments, the user 204 may be offered ticket upgrades for the event. In some embodiments, the user 204 may enter a bet or contest and receive a voucher to play in a similar bet or contest for a future sporting event based on the bet and the profile of the user or betting history. Further, any offers or bets provided may be based on the user's relative location to the arena, arena boundary, or tailgate boundary.

Continuing with step 414, the user 204 may accept in game offers and place in-game bets as described in embodiments above as described in embodiments above. In an exemplary scenario, the user 204 may create a bet at halftime when a team is down that the team will come back to win. The application accesses fan information such as social media accounts and selects fans that have indicated that the game is poor thereby selecting only a dejected group. In some embodiments, the information collected from the fans is not only information collected from application users but the information used may be collected from any fan social media or online profile. The application may also select like-minded users that have indicated that they also believe that the team will come back in the second half. In this way, the betting may be predictable and the betting lines may be set accordingly.

At step 416, the user 204 may receive awards based on the outcome of the bet. In some embodiments, the user 204 may receive money, credits, or awards based on the outcome of the bet. For example, the user 204 may win money based on the outcome of the bet. In some embodiments, the application may be directly connected to a financial account of the user 204 and deposit winnings directly. Alternatively, the application may store winnings in a usable account associated with the profile of the user 204 such that the user 204 may place bets using the winnings without withdrawal or deposit of funds. Alternatively, the application may be associated with a third-party account for secure transfer of funds such as any various digital wallets and financial transfer applications.

Upon winning bets, the user 204 may be credited with the winnings instantly. This gives the user 204 the ability to continue betting and to make bets based on winnings rather than an initial sum. The application may also track and update the winnings of the user 204 and modify offers and incentives based on the results. For example, if the user 204 won $5 on a peer-to-peer bet, the application may automatically offer a double or nothing bet to the user 204 (and, if the user 204 is betting in a head-to-head competition, to the other users) to continue the streak. Instant adjustments in the account keep a winner betting and keep a loser from unknowingly betting too much. Though instant payouts are discussed herein, in some embodiments a running total may be calculated and the user 204 may be restricted and offers may be based on the running total and payout may occur after a time period, after bet completion, or after all bets are reviewed and accuracy is verified by the house.

Further, when the user 204 loses a bet, the application may provide awards such as, for example, vouchers that may be redeemable for items such as clothes, products, and merchandise. In some embodiments, the user 204 may be offered access into bets or credits that may be redeemable for particular bets. Similarly, the user 204 may be offered items such as snack bar items or beverages at the venue or associated grocery store or liquor store items for tailgaters as described above.

Though embodiments described above discuss placing bets in locations associated with the arena 202 and geographic regions 208, it should be understood that the arena 202 may be any arena and a user may place a bet in the arena 202 with a user in a different arena that may be watching the sporting event on a broadcast in the other arena.

Any steps described in embodiments above may be omitted, added, or moved. Any steps may be performed in any order and rearranged to provide for different user experiences. For example, the user 204 may invite other users to join groups before creating a bet, though the exemplary diagram presented in FIG. 4 displays these events in a different order. In some embodiments, the events may take place as decided by the user 204, the application, other users, or application administrators.

Although the invention has been described with reference to the embodiments illustrated in the attached drawing figures, it is noted that equivalents may be employed and substitutions made herein without departing from the scope of the invention.

Having thus described various embodiments, what is claimed as new and desired to be protected by Letters Patent includes the following:

The invention claimed is:

1. One or more non-transitory computer-readable media that store computer-executable instructions that, when executed by at least one processor, perform a method of placing bets on a sporting event via a mobile application, the method comprising:
   - obtaining, by the mobile application from one or more cloud-based servers, a user profile comprising a first status level of a user;
   - generating a geofence surrounding a geographic region including a sporting venue providing the sporting event;
   - detecting, via a mobile device, a location of the user within the geofence,
   - obtaining, by the mobile application and from the one or more cloud-based servers, a set of online bets based on the location of the user within the geofence;
   - detecting, by an accelerometer of the mobile device, data indicative of movement of the mobile device;
   - determining that the data is indicative of a celebratory action;
   - detecting a celebratory sound by a microphone of the mobile device;
   - performing a comparison of the celebratory sound and the celebratory action to stored data on the one or more cloud-based servers;
   - determining that current conditions are indicative of favorable betting conditions based on the comparison;
   - offering, via the mobile device, a set of bets to the user based on the location of the user in the geofence, the user profile, and the favorable betting conditions,
   - wherein the set of bets are associated with the sporting event and the first status level;
   - receiving, from the user, placement of a bet from the set of bets;
   - determining an outcome of the bet based on the sporting event at the sporting venue; and
   - upgrading the user to a second status level based on the placement of the bet.

2. The media of claim 1, wherein the method further comprises tracking user interactions with the mobile device and offering incentives based on the user interactions.

3. The media of claim 1, wherein the user profile comprises a set of user preferences, and wherein the set of user preferences comprises at least one of a favorite player, a favorite team, a favorite arena, or a favorite seat at the sporting venue associated with the sporting event.

4. The media of claim 3, wherein the second status level comprises upgraded seats, discounted tickets, reduced price concessions, or additional tickets.

5. The media of claim 1, wherein the method further comprises receiving biometric data from the user before the placement of the bet.

6. The media of claim 1, wherein the method further comprises receiving funds to a betting account from a third-party account of the user.

7. The media of claim 1, wherein the method further comprises:

determining a sporting venue section location of the user; and providing incentives based on the sporting venue section location of the user.

8. The method of claim 7, wherein the set of bets is a first set of bets, and wherein the method further comprises:

offering a second set of bets that are different than the first set of bets, wherein the second set of bets are only offered when the user is within the sporting venue section location; and offering the incentives to the user to place a second bet of the second set of bets.

9. One or more non-transitory computer-readable media that store computer-executable instructions that, when executed by at least one processor, perform a method of placing bets on a sporting event by a mobile application, the method comprising:

obtaining, by the mobile application from one or more cloud-based servers, a user profile associated with a user;

determining additional data indicative of the user that is needed for the user profile;

generating a geofence surrounding a geographic region including a sporting venue providing the sporting event;

detecting, via a mobile device, a location of the user;

determining that the user is inside the geofence based on the location of the user;

wherein the geographic region comprises the sporting venue providing the sporting event;

offering incentives based at least in part on the additional data that is needed for the user profile;

upon receiving the additional data from the user, upgrading a status of the user on the user profile at the one or more cloud-based servers;

obtaining, by the mobile application and from the one or more cloud-based servers, a set of online bets based on the location of the user inside the geofence and the user profile;

detecting, by an accelerometer of the mobile device, movement of the mobile device;

wherein the movement of the mobile device is indicative of a celebratory action by the user;

detecting a celebratory sound by a microphone of the mobile device;

comparing the celebratory sound and the celebratory action to stored data on the one or more cloud-based servers;

determining that current conditions are indicative of favorable betting conditions;

offering, via the mobile device, a set of bets to the user based on the location of the user in the geographic region, the status of the user on the user profile, and the favorable betting conditions, wherein the set of bets are associated with the sporting event;

receiving, from the user, placement of a bet from the set of bets;

determining an outcome of the bet based on the sporting event at the sporting venue; and facilitating payment to a user account associated with the user based on the outcome of the bet.

10. The media of claim 9, wherein the method further comprises:

determining a geographic location of the user within the sporting venue; and providing the incentives based on the geographic location of the user within the sporting venue and the status of the user.

11. The media of claim 10, wherein the set of bets is a first set of bets, and wherein the method further comprises:

offering a second set of bets that are different than the first set of bets, wherein the second set of bets are only offered when the user is within the geographic location within the sporting venue; and offering additional incentives to the user to place a second bet of the second set of bets.

12. The media of claim 9, wherein the method further comprises:

accessing a social media post associated with the user; and offering the set of bets based in part on the social media post associated with the user.

13. The media of claim 9, wherein the method further comprises:

detecting an in-game event; and responsive to detecting, offering a second set of bets comprising updated betting odds.

14. The media of claim 9, wherein the method further comprises:

tracking a betting history associated with the user profile;

adjusting the set of bets based on the betting history; and offering additional incentives based on the betting history.

15. The media of claim 9, wherein the user is a first user, and the user profile is a first user profile; and wherein the method further comprises:

comparing the first user profile to a second user profile associated with a second user; and matching the first user with the second user in a peer-to-peer bet based on similarities in the first user profile and the second user profile.

16. A system for placing bets on a sporting event, the system comprising:

at least one processor;

a mobile device associated with a user;

a data store; and one or more non-transitory computer-readable media that store computer-executable instructions that, when executed by the at least one processor, perform a method of placing the bets on the sporting event by a mobile application, the method comprising:

obtaining, by the mobile application from one or more cloud-based servers, a user profile associated with the user;

detecting, via the mobile device, a location of the user in a geofence surrounding a geographic region, wherein the geographic region comprises a sporting venue providing the sporting event;

obtaining, by the mobile application and from the one or more cloud-based servers, a set of online bets based on the location of the user and the user profile;

detecting, by a sensor of the mobile device, movement of the mobile device within the geographic region, wherein the movement of the mobile device is indicative of a celebratory action by the user;

detecting a celebratory sound by a microphone of the mobile device;

performing a comparison of the celebratory sound and the celebratory action to stored data on the one or more cloud-based servers;

determining that current conditions are indicative of favorable betting conditions based on the comparison;

offering, via the mobile device, a set of bets to the user based on the location of the user in the geographic region, the user profile, and the favorable betting conditions, wherein the set of bets are associated with the sporting event;

receiving, from the user, placement of a bet from the set of bets at a first status level of the user stored on the user profile;

determining an outcome of the bet based on the sporting event at the sporting venue;

facilitating payment to an account associated with the user based on the outcome of the bet; and upgrading the user to a second status level based on the placement of the bet.

17. The system of claim 16, wherein the method further comprises:

tracking a set of betting trends associated with the sporting event; and offering a second bet based in part on the set of betting trends.

18. The system of claim 16, wherein the second status level comprises upgraded seats, discounted tickets, reduced price concessions, or additional tickets, wherein the user profile comprises a set of user preferences, and wherein the set of user preferences comprises at least one of a favorite player, a favorite team, a favorite arena, or a favorite seat at the sporting venue associated with the sporting event.

19. The system of claim 16, wherein the method further comprises:

detecting an in-game event; and responsive to detecting, offering a second set of bets comprising updated betting odds.

20. The system of claim 16, wherein the user is a first user, and the user profile is a first user profile; and wherein the method further comprises:

comparing the first user profile to a second user profile associated with a second user; and matching the first user with the second user in a peer-to-peer bet based on similarities in the first user profile and the second user profile.

* * * * *